Figure 3:
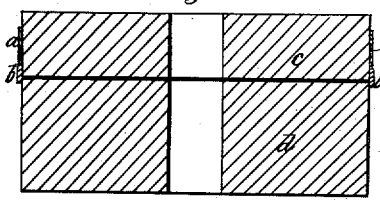
Figure 2:
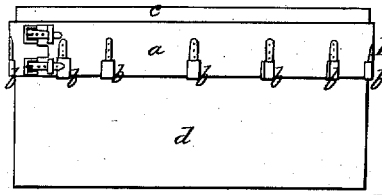
Figure 4:
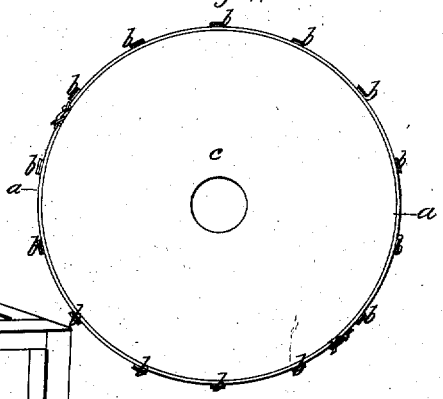
Figure 1:
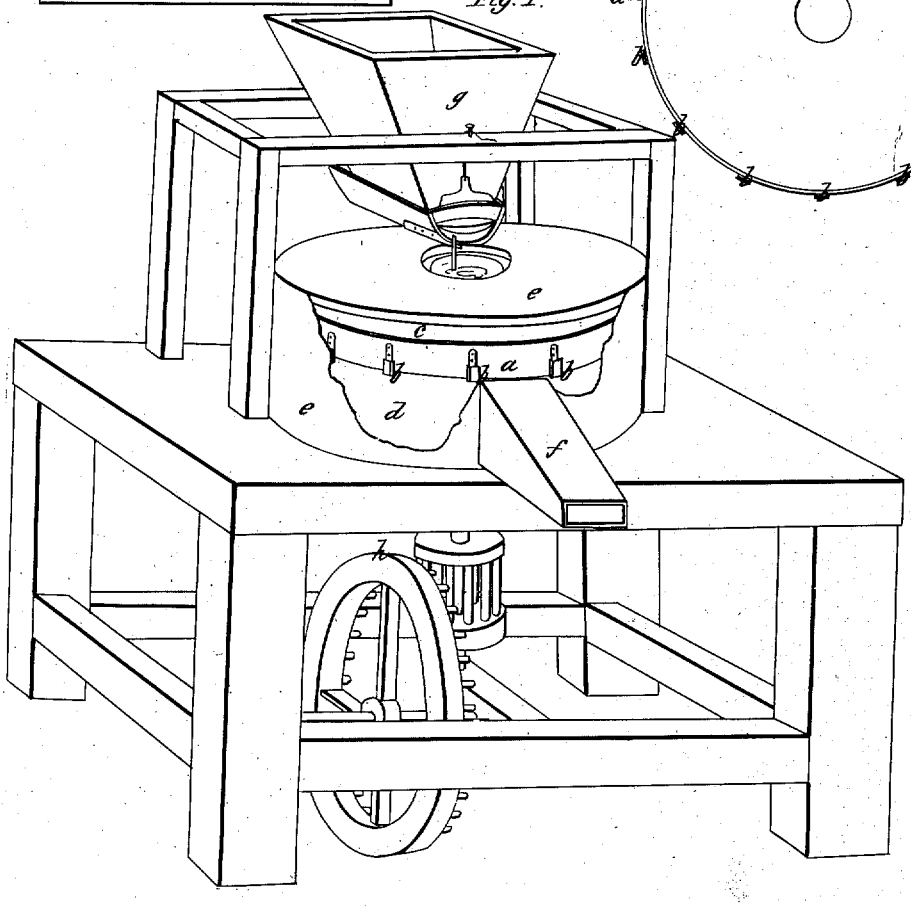

9364X NO PRINTED SPECIFICATION AVAILABLE

J. Pope,

Millstone Exhaust.

No Patented Feb. 5. 1836.

9364X Feb 5 1836

Isaiah Pope, of Windham, Maine.
Letters Patent.

The schedule referred to in these Letters Patent and making part of the same, containing a description in the words of the said Isaiah Pope himself of his improvement in the flour and meal cooler for mills.

---

To all to whom these presents shall come: Be it known that I Isaiah Pope of the State of Maine County of Cumberland and Town of Windham Clothier have invented a new and useful improvement in the manufacturing of corn wheat or other grain into flour which is by affixing a band of leather or other materials around the upper stone commonly called the runner and fastening it thereto by buckles, strings or other materials so that it shall adhere close to the stone, and to said band I attach what I term hanging blocks made of iron or other materials to the number of fifteen more or less, and let them descend from the strap to which they are affixed as low as the bottom of the furrows in the bedstone (by which means I am enabled to take the meal or flour away as fast as it discharges from the stones and thus prevent it from heating)) said blocks to be one and one fourth inches wide and one and one fourth inches high more or less, (as users may choose) to where they reach the strap and then to extend up so as to fasten to that by means of screws, rivets or other materials. By means of the above strap fixed as before described with blocks attached to reach as low as necessary on the outside of the stones) I cause the meal flour &c. to be carried immediately away as it leaves the stones and by that means prevent it from accumulating between the stones and curb and clogging the stone by means of the curb becoming filled with meal above the surface of the bedstone in which case the meal or flour must heat which operates much to the damage of the same.

It is proper that there should be about an inch space between the curb and the blocks which clear the meal from the stones, also that the spout should extend in width from the bedstone to the curb. and be it known that the invention which I claim is that of the hanging Drawing.

blocks attached to the band of leather (iron or other materials) and the band itself; which are fastened to the upper stone or runner and answer the purpose intended which is to grind cool, the mill stone being mounted or hung on its spindle with all its necessary fixtures as in the common method or practice of grinding.

Witnesses
William Cobb
Amos Parker

Isaiah Pope

Enrd.
M.G.C.

[455 [illegible]